United States Patent
Ferraro et al.

(10) Patent No.: US 12,338,302 B2
(45) Date of Patent: Jun. 24, 2025

(54) PROPYLENE BASED COPOLYMER FOR CONTAINERS

(71) Applicant: BASELL POLIOLEFINE ITALIA S.R.L., Milan (IT)

(72) Inventors: Gianpiero Ferraro, Ferrara (IT); Marco Ciarafoni, Ferrara (IT); Claudio Cavalieri, Ferrara (IT); Caroline Cathelin, Ferrara (IT); Giansiro Prini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 392 days.

(21) Appl. No.: 17/908,333

(22) PCT Filed: Feb. 23, 2021

(86) PCT No.: PCT/EP2021/054392
§ 371 (c)(1),
(2) Date: Aug. 31, 2022

(87) PCT Pub. No.: WO2021/175649
PCT Pub. Date: Sep. 10, 2021

(65) Prior Publication Data
US 2023/0095189 A1 Mar. 30, 2023

(30) Foreign Application Priority Data
Mar. 4, 2020 (EP) .................................. 20160948

(51) Int. Cl.
C08F 210/06 (2006.01)
B29C 45/00 (2006.01)
B29K 23/00 (2006.01)
B29L 31/00 (2006.01)

(52) U.S. Cl.
CPC ........ *C08F 210/06* (2013.01); *B29C 45/0001* (2013.01); *B29K 2023/14* (2013.01); *B29L 2031/712* (2013.01)

(58) Field of Classification Search
CPC .................. C08F 210/06; B29K 2023/14
See application file for complete search history.

(56) References Cited

U.S. PATENT DOCUMENTS

| | | | | |
|---|---|---|---|---|
| 2010/0285255 A1* | 11/2010 | Cavalieri | ............. | C08F 210/06 428/36.92 |
| 2014/0134911 A1* | 5/2014 | Cavalieri | ................. | D04H 3/16 526/348.5 |

FOREIGN PATENT DOCUMENTS

| | | |
|---|---|---|
| CN | 1277619 A | 12/2000 |
| CN | 103476806 A | 12/2013 |
| EP | 0361493 A1 | 4/1990 |
| EP | 0728769 A1 | 8/1996 |
| EP | 0812371 A1 | 12/1997 |
| EP | 1012195 A1 | 6/2000 |
| EP | 3567061 A1 | 11/2019 |
| WO | 2009077328 A1 | 6/2009 |
| WO | WO-2011131637 A1 * | 10/2011 ............... C08J 5/18 |
| WO | 2012139897 A1 | 10/2012 |
| WO | 2016087185 A1 | 6/2016 |

OTHER PUBLICATIONS

International Search Report and Written Opinion Mailed May 6, 2021 (May 6, 2021) For Corresponding PCT/EP2021/054392.

* cited by examiner

*Primary Examiner* — Michael C Miggins

(57) ABSTRACT

A propylene/1-hexene copolymer having
i) the content of 1-hexene derived units, measured by $C^{13}$-NMR, ranging from 1.5 wt % to 2.5 wt % and the content of propylene derived units ranging from 97.5 to 98.5 wt. %;
ii) a melting temperature, measured by DSC, ranging from 148 to 153° C.;
iii) an amount of fraction insoluble in xylene at 25° C. higher than 97.0%; and
iv) a melt flow rate (MFR), measured according to ISO 1133, 230° C., 2.16 kg, ranging from 35 to 65 g/10 min.

10 Claims, No Drawings

PROPYLENE BASED COPOLYMER FOR CONTAINERS

This application is the U.S. National Phase of PCT International Application PCT/EP2021/054392, filed Feb. 23, 2021, claiming benefit of priority to European Patent Application No. 20160948.4, filed Mar. 4, 2020, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to propylene copolymers and containers made therefrom.

BACKGROUND OF THE INVENTION

In some instances, containers are manufactured via an injection molding process. In some instances, the manufacturing process takes place in four steps.

The first step is a filling step wherein the mold is filled with a molten polymer at a velocity (flow rate) controlled by the machine.

In the second step, that is, a packing step, pressure is applied to the polymer melt to compress the polymer and force more material into the mold.

The third step is a cooling step. In this step, no more pressure is applied to the polymer. The mold is held shut, and the polymer cools until the part can be ejected. In some instances, the cooling step is the longest part of the molding cycle and accounts for up to 80 percent of the total cycle time.

In the last step, the mold is opened, the part is ejected, and preparation for the next cycle is begun.

It is believed that any attempt to shorten the whole cycle time would be more effective if applied to the cooling time. It is further believed that the mold can be opened, and the part ejected when the polymer within the mold has solidified and crystallized. Moreover, it is also believed that polymers having higher crystallization temperatures (Tc) use less time to reach the Tc from the melted state.

SUMMARY OF THE INVENTION

In a general embodiment, the present disclosure provides a propylene/1-hexene copolymer having:

i) the content of 1-hexene derived units, measured by $C^{13}$-NMR, ranging from 1.5 wt % to 2.5 wt % alternatively from 1.7 to 2.3% wt, and the content of propylene derived units ranging from 97.5 to 98.5 wt. %, alternatively from 97.7 to 98.3% wt;

ii) a melting temperature measured by DSC ranging from 148 to 153° C., alternatively from 149 to 152° C.;

iii) an amount of fraction insoluble in xylene at 25° C. higher than 97.0%, alternatively higher than 97.4%, alternatively ranging from 97.5 to 98.5% wt; and iv) a melt flow rate (MFR), measured according to ISO 1133, 230° C., 2.16 kg, ranging from 35 to 65 g/10 min; alternatively from 37 to 55 g/10 min; alternatively from 40 to 50 g/10 min.

DETAILED DESCRIPTION OF THE INVENTION

In some embodiments, the features i) to iv) are not inextricably linked to each other. In some embodiments, a selection of a level of any of the features i) to iv) does not involve a selection of a level of the remaining features. In some embodiments, the selection of an additional feature in combination with features i) to iv) does not involve a selection of the level of features i) to iv).

The copolymer contains propylene and 1-hexene, the sum of these two comonomers derived units content being 100 wt %. In some embodiments, the copolymer is absent other monomers.

In some embodiments, the MFR of feature (iv) is obtained directly from polymerization. In some embodiments, the polymerization occurs in the presence of a molecular weight regulator. In some embodiments, the molecular weight regulator is hydrogen. In some embodiments, the MFR of feature (iv) is obtained by chemical degradation (via peroxide) of a copolymer having a lower MFR.

The copolymers have a stereoregularity of isotactic type of the propylenic sequences, resulting in high crystallinity. This is confirmed by the low value of xylene extractables.

In some embodiments, the copolymers of the present disclosure have a molecular weight distribution, expressed as Polydispersity Index, of lower than 5, alternatively lower than 4.5, alternatively in the range 4.3 to 3.3.

In some embodiments, the copolymers of the present disclosure have a low level of hexane extractable, thereby rendering the copolymers for the preparation of food containers. In some embodiments, the hexane extractables measured according to FDA 21 77:1520 is lower than 2.2 wt %; alternatively lower than 2.1 wt %; alternatively equal to or lower than 2.0 wt %.

In some embodiments, the copolymers have a crystallization temperature (Tc) higher than 119° C., alternatively higher than 120° C., alternatively in the range 120-124° C.

In some embodiments, the difference between the melting temperature Tm and the crystallization temperature Tc is less than 30° C.

In some embodiments, the copolymer has a Flexural Modulus (according to ISO 178) in the range of 800-1200 $N/m^2$ and an impact resistance (Charpy) at 23° C. ranging from 1 to 5 $KJ/m^2$ and at 0° C. ranging from 0.8 to 3 $KJ/m^2$.

In some embodiments, the present disclosure provides an injection molded container made of the propylene copolymer. In some embodiments, the container is a thin wall injection molded container. As used herein, the term "thin wall" refers to a thickness of the walls lower than 0.7 mm and a length/thickness ratio over 150.

In some embodiments, the container has a haze, measured on 0.4 mm wall of the container, lower than 4.0%; alternatively lower than 3.5%; alternatively lower than 3.0%.

In some embodiments, the container has an impact test at 23° C., measured on 0.4 mm wall, higher than 2.0 J; alternatively higher than 3.0 J; alternatively higher than 3.2 J. In some embodiments, the containers, measured on 0.4 mm wall, have top load values higher than 230 N; alternatively higher than 250 N.

In some embodiments, the use of the copolymer of the present disclosure in the TWIM process reduces about 30% the cycle time with respect to the use of a commercial propylene/ethylene copolymer for the same application.

In some embodiments, the copolymer for the injection molded container of the present disclosure is prepared by polymerization in one or more polymerization steps. In some embodiments, the polymerization is carried out in the presence of Ziegler-Natta catalysts. In some embodiments, the catalysts are made from or containing a solid catalyst component made from or containing a titanium compound having at least one titanium-halogen bond, and an electron-donor compound, both supported on a magnesium halide in active form. In some embodiments, the catalysts are made from or containing a co-catalyst, which is an organoaluminium compound. In some embodiments, the organoaluminium compound is an aluminum alkyl compound. In some embodiments, an external electron donor is added.

In some embodiments, the solid catalyst components are made from or containing compounds selected from the group consisting of ethers and esters of mono and dicarboxylic acids as electron-donors (internal donors).

In some embodiments, the electron-donor compounds are selected from the group consisting of esters of succinic acid, esters of glutaric acid, esters of phthalic acid, and 1,3-diethers of formula (I)

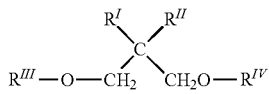

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, the structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both. In some embodiments, the substituents are bonded to the condensed cyclic structures.

In some embodiments, the ethers are selected from the ethers described in European Patent Application Nos. 361493 and 728769.

In some embodiments, the diethers are selected from the group consisting of 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, and 9,9-bis (methoxymethyl) fluorene.

In some embodiments, the electron-donor compounds are phthalic acid esters. In some embodiments, the phthalic acid esters are selected from the group consisting of diisobutyl phthalate, dioctyl phthalate, diphenyl phthalate, and benzyl-butyl phthalate.

In some embodiments, a mixture of at least two electron donor compounds, wherein a first electron donor compound is present in an amount from 30 to 90% by mol with respect to the total amount of donors and selected from the group consisting of succinates and glutarates and a second electron donor compound is 1,3-diether.

In some embodiments, a $MgCl_2 \cdot nROH$ adduct is reacted with an excess of $TiCl_4$ containing the electron-donor compound. In some embodiments, the $MgCl_2 \cdot nROH$ adduct is in the form of spheroidal particles. In some embodiments, n is from 1 to 3. In some embodiments, ROH is selected from the group consisting of ethanol, butanol, and isobutanol. In some embodiments, the reaction temperature is from 80 to 120° C. The solid is then isolated and reacted once more with $TiCl_4$, after which the reaction product is separated and washed with aliquots of a hydrocarbon until chlorine ions have disappeared.

In some embodiments and in the solid catalyst component, the titanium compound, expressed as Ti, is present in an amount from 0.5 to 10% by weight. In some embodiments, the quantity of total electron-donor compound which remains fixed on the solid catalyst component is 5 to 20% by moles with respect to the magnesium dihalide.

In some embodiments, the titanium compounds used for the preparation of the solid catalyst component are selected from the group consisting of halides of titanium and halogen alcoholates of titanium. In some embodiments, the titanium compound is titanium tetrachloride.

In some embodiments, the Al-alkyl compounds used as co-catalysts are made from or containing Al-trialkyls. In some embodiments, the Al-trialkyls are selected from the group consisting of Al-triethyl, Al-triisobutyl, and Al-tri-n-butyl.

In some embodiments, the Al-alkyl compound is used in such a quantity that the Al/Ti ratio is from 1 to 1000.

In some embodiments, the electron-donor compounds used as external donors are selected from the group consisting of aromatic acid esters and silicon compounds. In some embodiments, the aromatic acid esters are alkyl benzoates. In some embodiments, the silicon compounds contain at least one Si—OR bond, where R is a hydrocarbon radical.

In some embodiments, the silicon compounds are selected from the group consisting of (tert-butyl)$_2$Si(OCH$_3$)$_2$, (cyclohexyl)(methyl)Si(OCH$_3$)$_2$, (cyclopentyl)$_2$Si(OCH$_3$)$_2$, (phenyl)$_2$Si(OCH$_3$)$_2$, and (1,1,2-trimethylpropyl)Si(OCH$_3$)$_3$.

In some embodiments, the terpolymers are prepared by using catalysts containing a mixture of succinate and 1,3-diether as internal donor and (cyclopentyl)$_2$Si(OCH$_3$)$_2$ as an external donor.

In some embodiments, the propylene/hexene-1 polymers are produced with a polymerization process as described in European Patent Application No. 1 012 195.

In some embodiments, the process includes the steps of feeding the monomers to the polymerization zones in the presence of catalyst under reaction conditions and collecting the polymer product from the polymerization zones. In the process, the growing polymer particles flow upward through a first polymerization zone (riser) under fast fluidization conditions, leave the riser and enter a second polymerization zone (downcomer) through which the growing polymer particles flow downward in a densified form under the action of gravity, leave the downcomer and are reintroduced into the riser, thereby establishing a circulation of polymer between the riser and the downcomer.

In the downcomer, the polymer particles flow under the action of gravity in a densified form, thereby achieving the high values of density of the solid and approaching the bulk density of the polymer. In some embodiments. a positive gain in pressure is obtained along the direction of flow, thereby permitting reintroduction of the polymer into the riser. In this way, a "loop" circulation is set up, which is defined by the balance of pressures between the two polymerization zones and by the head loss introduced into the system.

In some embodiments, the condition of fast fluidization in the riser is established by feeding a gas mixture made from or containing the relevant monomers to the riser. In some embodiments, the feeding of the gas mixture is effected below the point of reintroduction of the polymer into the riser by a gas distributor. In some embodiments, the velocity of transport gas into the riser is higher than the transport velocity under the operating conditions, alternatively from 2 to 15 m/s.

In some embodiments, the polymer and the gaseous mixture leaving the riser are conveyed to a solid/gas separation zone for separation. From the separation zone, the polymer enters the downcomer. The gaseous mixture leaving the separation zone is compressed, cooled, and transferred to the riser. In some embodiments, the gaseous mixture is supplemented with make-up monomers and/or molecular weight regulators. In some embodiments, the transfer occurs via a recycle line for the gaseous mixture.

In some embodiments, the control of the polymer circulating between the two polymerization zones occurs by metering the amount of polymer leaving the downcomer through controlling the flow of solids. In some embodiments, the control of flow is achieved with mechanical valves.

In some embodiments, the operating temperature is between 50 to 120° C.

In some embodiments, the operating pressure is between 0.5 and 10 MPa, alternatively between 1.5 to 6 MPa.

In some embodiments, one or more inert gases are maintained in quantities in the polymerization zones, such that the sum of the partial pressures of the inert gases is between 5 and 80% of the total pressure of the gases. In some embodiments, the inert gas is nitrogen or propane.

In some embodiments, the catalysts are fed to the riser at any point of the riser. In some embodiments, the catalysts are fed at any point of the downcomer. In some embodiments, the catalyst is in any physical state. In some embodiments, the catalysts are in either solid or liquid state.

In some embodiments, additives, fillers, and pigments, are added. In some embodiments, the additives are selected from the group consisting of nucleating agents, and extension oils. In some embodiments, the fillers are mineral fillers. In some embodiments, the pigments are selected from the group consisting of organic and inorganic pigments. In some embodiments, the fillers are inorganic fillers. In some embodiments, the inorganic fillers are selected from the group consisting of talc, calcium carbonate, and mineral fillers.

In some embodiments, the nucleating agents are added to the compositions of the present disclosure in quantities ranging from 0.05 to 2% by weight, alternatively from 0.1 to 1% by weight, with respect to the total weight.

In some embodiments, the shape of the container is selected from the group consisting of cubic, conic, and irregular shapes.

The particulars are given in the following examples, which are given to illustrate, without limiting, the present disclosure.

EXAMPLES

Characterization Methods

Melting Temperature and Crystallization Temperature:

Determined by differential scanning calorimetry (DSC). A sample, weighing 6±1 mg, was heated to 220±1° C. at a rate of 20° C./min and kept at 220±1° C. for 2 minutes in nitrogen stream. Thereafter, the sample was cooled at a rate of 20° C./min to 40±2° C. The sample was maintained at this temperature for 2 min, thereby permitting the sample to crystallize. Then, the sample was again fused at a temperature rise rate of 20° C./min up to 220° C.±1. The melting scan was recorded. A thermogram was obtained. The melting temperatures and crystallization temperatures were read.

Melt Flow Rate

Determined according to the method ISO 1133 (230° C., 5 kg).

Solubility in Xylene:

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirring for further 30 minutes. The closed flask was then kept for 30 minutes in a bath of ice and water and in thermostatic water bath at 25° C. for 30 minutes as well. The resulting solid was filtered on quick filtering paper. 100 ml of the filtered liquid was poured into a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

1-hexene content:

Determined by $^{13}$C-NMR spectroscopy in terpolymers:

NMR analysis. $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum center (O1) | 30 ppm |
| Decoupling sequence | WALTZ 65_64pl |
| Pulse program [1] | ZGPG |
| Pulse Length (Pl) [2] | for 90° |
| Total number of points (TD) | 32K |
| Relaxation Delay [2] | 15 s |
| Number of transients [3] | 1500 |

The total amount of 1-hexene and ethylene as molar percent were calculated from diad using the following relations:

$$[P]=PP+0.5PH$$

$$[H]=HH+0.5PH$$

Haze (on 1 mm plaque):

5×5 cm specimens were cut molded plaques of 1 mm thick. The haze value was measured using a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

The measurement and computation principle are given in the ASTM-D1003 method.

75×75×2 mm plaques were molded with a GBF Plastiniector G235/90 Injection Molding Machine, 90 tons under the following processing conditions:

Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar Hold pressure profile: First stage 5 sec
  Second stage 10 sec
Cooling time: 20 sec
Mold water temperature: 40° C.
The plaques were conditioned for 12 to 48 hours at relative humidity of 50% and temperature of 23° C.
  Haze on Container:
  The haze on container were measured by cutting a 5×5 cm specimens from the container wall and using the procedure described for the haze (on 2 mm plaque).
  Top Load:
  After at least 70-hours conditioning at 23° C. and 50% relative humidity, the bottle was settled between the two plates of a dynamometer and compressed with a stress velocity of the plate of 10 mm/min.
  The stress at collapse of the container was recorded. The value was reported in N. The Top Load value was the mean value obtained from measurements repeated on 6 injection molded containers.
  Container Impact Test (CIT)
  The test was a biaxial impact test. The container, bottom up, was put on a sample older, having the same dimension of the container.
  The plate for the impact had a diameter of 62 mm and 5 kg of weight. The plate fell from 600 mm. The results are expressed in Joule. The results are an average of 10 tests.
  Containers to be tested were produced with an injection molding machine with the following specs:
Injection molding unit parameters:
Injection screw stroke: 1200 kN
Screw diameter: 32 mm
Injected volume: 102.9 cm3
Screw ratio L/D: 20
Max injection press: 2151 bar
  The items had the listed characteristics:
Volume: 250 cc
Surface treatment: Polished
  The shape of the container was a truncated pyramid with a square base, wherein the top base had a side of 70 mm and the bottom base had a side of 50 mm, the height being 80 mm
  IZOD Impact Strength:
  Determined according to ISO 180/1A. Samples were obtained according to ISO 294-2.
  The Hexane Extractables:
  measured according to FDA 21 77:1520

Example 1

A copolymer was prepared by polymerizing propylene and hexene-1 in the presence of a catalyst under continuous conditions in a plant including a polymerization apparatus as described in European Patent Publication No. EP 1 012 195.

The catalyst was fed to the polymerization apparatus, including two interconnected cylindrical reactors, riser and downcomer. Fast fluidization conditions were established in the riser by recycling gas from the gas-solid separator. In examples 1-2, no barrier feed was used.

The catalyst was made from or containing a catalyst component prepared as described in Example 5 of Patent Cooperation Treaty Publication No. WO2012/139897. The catalyst component was used with dicyclopentyl dimethoxy silane (DCPMS) as external donor and with triethylaluminium (TEA).

The polymer particles exiting the reactor were subjected to a steam treatment to remove the reactive monomers and volatile substances and then dried. The main operative conditions and characteristics of the produced polymers are indicated in Table 1.

TABLE 1

| Polymerization Process | | |
|---|---|---|
| Example | | Ex. 1 |
| TEAL/external donor | wt/wt | 4 |
| TEAL/catalyst | wt/wt | 6 |
| Temperature | ° C. | 78 |
| Pressure | bar-g | 26 |
| $H_2/C_3^-$ riser | mol/mol | 0.032 |
| $C_6^-/(C_6^- + C_3^-)$ | mol/mol | 0.022 |

$C_3^-$ = propylene $C_6^-$ = 1-hexene

The polymer particles were fed to an extruder, wherein the polymer particles were mixed with 500 ppm of Irganox 1010, 1000 ppm of Irgafos 168, 500 ppm of Ca stearate, 1000 ppm of GMS 90, and 0.4% of NX800. The polymer particles were extruded under nitrogen atmosphere in a twin screw extruder, at a rotation speed of 250 rpm and a melt temperature of 200-250° C.

Properties of the resulting material are reported in Table 2.

Comparative Example 1

Comparative Example 1 Corresponds to Ex. 1 of Patent Cooperation Treaty Publication No. WO2009/077328

TABLE 2

|  |  | Ex. 1 | Comp. Ex. 1 |
|---|---|---|---|
| 1.hexene content | Wt % | 2.2 | 2.9 |
| Xylene soluble | Wt % | 2.2 | 3.0 |
| Tm | ° C. | 151 | 146 |
| MFR | dl/g | 41 | 27 |
| Izod Impact @23° C. | kJ/m$^2$ | 3.6 | 3.5 |
| Tc | ° C. | 122 | 113.8 |
| PI |  | 3.6 | 3.7 |
| Flexural modulus | MPa | 1200 | 1140 |
| Elongation @break | % | 690. | 430 |

The polymer of Ex. 1 was used in the production of TWIM containers under the conditions previously described. The total cycle time was 4 seconds. For a comparison, a commercially available random propylene/ethylene copolymer for TWIM having a MFR of 40 g/10' and a Tc of 116° C. was used in the preparation of TWIM containers. In this case, the total cycle time was 6 seconds.

What is claimed is:
1. A propylene/1-hexene copolymer having
  i) the content of 1-hexene derived units, measured by $^{13}$C-NMR, ranging from 1.5 wt % to 2.5 wt % and the content of propylene derived units ranging from 97.5 to 98.5 wt. %;
  ii) a melting temperature, measured by DSC, ranging from 148 to 153° C.;
  iii) an amount of fraction insoluble in xylene at 25° C. higher than 97.0%;
  iv) a melt flow rate (MFR), measured according to ISO 1133, 230° C., 2.16 kg, ranging from 35 to 65 g/10 min.; and v) a crystallization temperature higher than 119° C., wherein the difference between the melting temperature and the crystallization temperature is less than 30° C.

2. The propylene/1-hexene copolymer of claim 1, wherein the content of 1-hexene derived units ranges from 1.7 wt % to 2.3 wt %.

3. The propylene/1-hexene copolymer claim 1, wherein the weight amount of fraction insoluble in xylene at 25° C. is higher than 97.4 wt. %.

4. The propylene/1-hexene copolymer claim 1, wherein the melting temperature measured by DSC ranges from 149 to 152° C.

5. The propylene/1-hexene copolymer claim 1, wherein the melt flow rate, MFR, measured according to ISO 1133, 230° C., 2.16 kg, ranges from 37 to 55 g/10 min.

6. The propylene/1-hexene copolymer according to claim 1, the Polydispersity Index lower than 5.

7. The propylene/1-hexene copolymer according to claim 1, wherein the crystallization temperature is from 120 to 124° C.

8. A container comprising a propylene/1-hexene copolymer according to claim 1.

9. The container according to claim 8 obtained by an injection molding process.

10. The container according to claim 8 obtained by a Thin Wall Injection Molding process.

\* \* \* \* \*